United States Patent [19]

Matsuhiro et al.

[11] Patent Number: 4,558,018

[45] Date of Patent: Dec. 10, 1985

[54] SILICON NITRIDE SINTERED BODIES AND A METHOD FOR PRODUCING THE SAME

[75] Inventors: Keiji Matsuhiro; Minoru Matsui, both of Nagoya, Japan

[73] Assignee: NGK Insulators, Ltd., Japan

[21] Appl. No.: 502,288

[22] Filed: Jun. 8, 1983

[30] Foreign Application Priority Data

Apr. 4, 1983 [JP] Japan .................................. 58-57915

[51] Int. Cl.$^4$ ............................................. C04B 35/58
[52] U.S. Cl. ....................................... 501/97; 264/65; 501/98
[58] Field of Search ....................... 501/97, 98; 264/65

[56] References Cited

U.S. PATENT DOCUMENTS

| | | | |
|---|---|---|---|
| 3,839,540 | 10/1974 | Arrol ...................................... | 501/97 |
| 4,025,351 | 5/1977 | Masaki .................................. | 501/98 |
| 4,073,845 | 2/1978 | Buljan et al. ........................... | 264/65 |
| 4,099,979 | 7/1978 | Lange et al. ........................... | 501/97 |
| 4,143,107 | 3/1979 | Ishii et al. .............................. | 264/65 |
| 4,264,547 | 4/1981 | de Pous .................................. | 264/65 |
| 4,280,973 | 7/1981 | Moskowitz et al. .................... | 264/65 |
| 4,443,394 | 4/1984 | Ezis ........................................ | 264/65 |

FOREIGN PATENT DOCUMENTS 56-149378  11/1981  Japan .................................... 501/97

OTHER PUBLICATIONS

Lange, F. F., "Silicon Nitride Polyphase Systems: Fabrication, Microstructure, and Properties"—International Metals Reviews, 1980, No. 1, pp. 1-20.

Primary Examiner—Helen M. McCarthy
Attorney, Agent, or Firm—Parkhurst & Oliff

[57] ABSTRACT

Silicon nitride sintered bodies having particularly excellent strength and creep resistance at high temperatures, in which a total amount of MgO and $Al_2O_3$ is more than 6% by weight and not more than 30% by weight and a weight ratio of $MgO/Al_2O_3$ is 4–19, with the remainder being mainly $Si_3N_4$. At least one of crystalline magnesium sialon represented by the general formula $Mg_{x/2}Si_{6-y+x/2}Al_{y-x}O_yN_{8-y}$ ($0<x\leq y<8$, preferably $0.9\leq x/y$) and crystalline forsterite represented by the formula $Mg_2SiO_4$ is contained as a second phase in addition to the main crystal of $Si_3N_4$. The sintered bodies are produced by mixing a raw material powder of silicon nitride containing less than 2% by weight of oxygen with MgO and $Al_2O_3$ so that a total amount of MgO and $Al_2O_3$ is from 6% by weight to 30% by weight and a weight ratio of $MgO/Al_2O_3$ is 4–19, and firing the resulting mixture at a temperature of 1,650°–1,850° C. in nitrogen or an inert gas atmosphere.

2 Claims, 4 Drawing Figures

SILICON NITRIDE SINTERED BODIES AND A METHOD FOR PRODUCING THE SAME

BACKGROUND OF THE INVENTION

1. Field of the Invention

The present invention relates to silicon nitride sintered bodies having particularly excellent strength and creep resistance at high temperatures and a method for producing the same.

2. Description of the Prior Art

In general, silicon nitride sintered bodies have superior mechanical properties at relatively high temperatures as compared to metals, so that these bodies have generated particular interest as structural materials for gas turbine parts, adiabatic engine parts, ball bearings for high temperature, parts for various high temperature furnaces and the like, which operate at high temperatures.

For the production of silicon nitride sintered bodies, the following processes have been used.

For example, to silicon nitride powder is added a sintering aid selected from the group consisting of MgO, $Al_2O_3$, $Y_2O_3$, $CeO_2$ and the like and the resulting mixture is sintered under an ambient or a high pressure non-oxidizing atmosphere.

A shaped body of Si powder is fired under nitrogen gas (reaction bonding process).

Alternatively, Si powder is mixed with a sintering aid, such as MgO, $Al_2O_3$, $Y_2O_3$ and the like and the resulting mixture is formed into a shaped body and then the shaped body is nitrided in nitrogen gas, after which the shaped body is additionally sintered at a higher temperature under an ambient or high pressure non-oxidizing atmosphere.

However, among the prior silicon nitride sintered bodies, when the silicon nitride sintered body parts obtained by the sintering process under ambient pressure, were used at a high temperature of about 1,400° C., such parts have a very poor durability because of the deficiency of the strength at high temperature. The sintered bodies obtained by sintering under high pressure, that is a hot press process or a hot isostatic press process, are very difficult to produce and have excessive manufacturing costs in the production of large articles, complicated shapes or mass production of articles.

SUMMARY OF THE INVENTION

The present invention aims to obviate these prior defects and to obtain silicon nitride sintered bodies having excellent strength and creep resistance at high temperatures and a method for producing inexpensively and easily silicon nitride sintered bodies through a sintering process under ambient pressure.

The present invention has found that quite novel silicon nitride sintered bodies having excellent strength and creep resistance at high temperatures, which consist mainly of crystalline $Si_3N_4$ and contain at least one of crystalline magnesium sialon and crystalline forsterite as the second phase, are obtained by sintering a mixture of $Si_3N_4$, MgO and $Al_2O_3$ in a specific ratio in nitrogen or in an inert gas atmosphere under ambient pressure.

That is, the present invention lies in silicon nitride sintered bodies which contain MgO and $Al_2O_3$ in a total amount of more than 6% by weight and not more than 30% by weight and a weight ratio of $MgO/Al_2O_3$ is within the range of 4–19, and at least one of crystalline magnesium sialon represented by the general formula $Mg_{x/2}Si_{6-y+x/2}Al_{y-x}O_yN_{8-y}$ ($0 < x \leq y < 8$, preferably $0.9 \leq x/y$) and crystalline forsterite represented by the formula $Mg_2SiO_4$ is contained as a second phase in addition to the main crystalline phase of $Si_3N_4$.

Chemically, the silicon nitride body contains MgO and $Al_2O_3$ in a total amount of more than 6% by weight and not more than 30% by weight and a weight ratio of $MgO/Al_2O_3$ is within the range of 4–19.

DESCRIPTION OF THE PREFERRED EMBODIMENTS

Silicon nitride sintered bodies of the present invention will hereinafter be explained in more detail.

Figure 1:
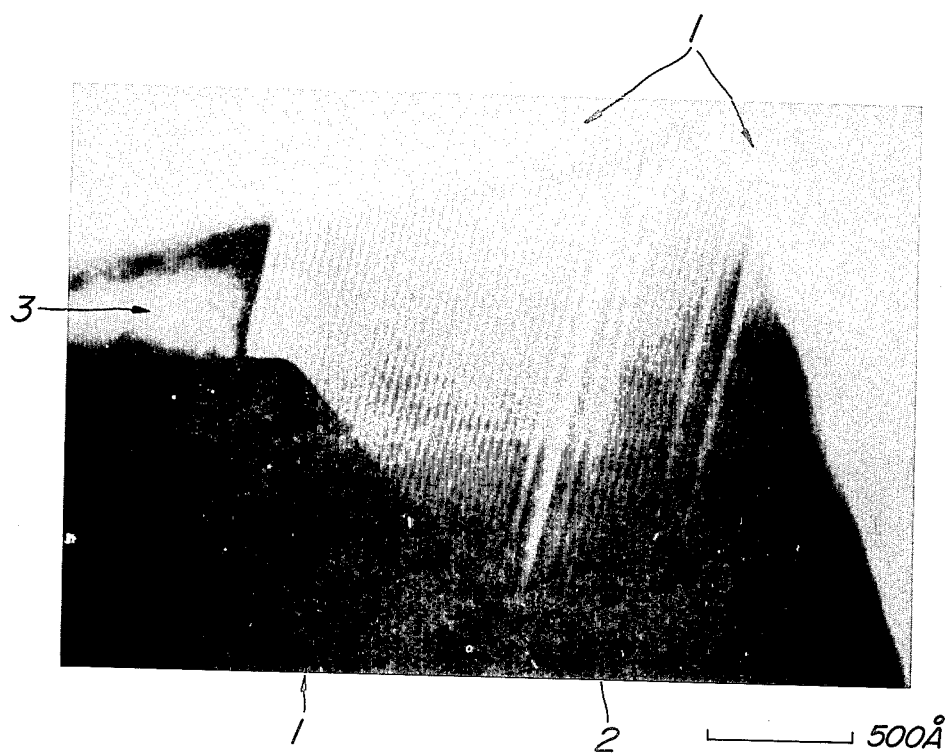
FIG. 1 is a typical microstructure of Sample No. 7 of the present invention which is observed by a transmission electron microscope.

FIG. 1 shows the microstructure of the present invention which is observed by a transmission electron microscope, in which 1 represents crystalline $Si_3N_4$, 2 represents crystalline magnesium sialon and 3 represents crystalline forsterite. No glass is found at the boundary of crystalline phases and it can be seen that the crystals are strongly bonded with one another. When the contents of Mg and Al in crystalline magnesium sialon are respectively analyzed from each X-ray intensity and the ratio of x to y in the general formula $Mg_{x/2}Si_{6-y+x/2}Al_{y-x}O_yN_{8-y}$ is calculated therefrom, said ratio is greater than 0.90.

As mentioned above, in the microstructure of the sintered body of the present invention, the grain boundary of crystalline $Si_3N_4$ of the main component is constructed with crystalline magnesium sialon and crystalline forsterite as the second phase and the crystal grain boundary of $Si_3N_4$ is substantially completely crystallized into the second phase of crystalline magnesium sialon, crystalline forsterite and the like, whereby the sintered body of the present invention has excellent strength and creep resistance at high temperatures.

In general, $Si_3N_4$ has a very poor sinterability. Therefore, in order to obtain a dense sintered body under ambient pressure, it is necessary to add a substance which promotes densification of $Si_3N_4$, such as a sintering aid which forms a liquid phase during the densification. Such a substance becomes a liquid phase at the initial stages of sintering and serves a very effective role for densifying $Si_3N_4$. However, after sintering, has been completed said substance remains as a glass in the crystalline grain boundaries resulting in a lowering of the strength of the sintered body at high temperatures.

However, the sintered bodies containing MgO and $Al_2O_3$ of the limited composition of the present invention form a liquid phase consisting of Si, Mg, Al, O and N at the initial stages of sintering and the densification of $Si_3N_4$ is promoted in the aid of this liquid phase and the density of the sintered bodies is improved. The major portion of the finally formed liquid phase is crystallized into magnesium sialon crystals and/or forsterite crystals and the amount of glass remaining is very small.

The migration rate of the component ion of magnesium sialon crystals, forsterite crystals and the like are far lower than that of glass, so that even when stress is applied at high temperatures, plastic deformation does not extensively occur. Therefore, the sintered bodies of the present invention which contain these crystals in the crystalline grain boundaries of $Si_3N_4$ crystals and have substantially no glass present, have unexpectedly improved strength and creep resistance at high temperatures.

The sintered bodies of the present invention consist of 93–65% by weight of crystalline $Si_3N_4$, 25–0.1% by weight of crystalline magnesium sialon and/or 15–0.1% by weight of crystalline forsterite and less than 1% by weight of glass and have a relative density of more than 95%, so that the strength and creep resistance at high temperatures are excellent.

Accordingly, it is very important that the total amount of MgO and $Al_2O_3$ is greater than 6% by weight and not greater than 30% by weight. When said total is less than 6% by weight, the densification of the sintered body is not satisfied and the relative density is low and practically useful strength cannot be obtained. While when said amount exceeds 30% by weight, the above described second phase is not satisfactorily crystallized and the amount of residual glass increases and the strength at high temperatures is reduced and such an amount is not preferable.

The reason why the weight ratio of $MgO/Al_2O_3$ is 4–19, is based on that when said ratio is less than 4 or greater than 19, the crystallization of the second phase is insufficient and said second phase remains in the form of a glass and high strengths at high temperatures cannot be obtained.

The reason why the ratio of x to y in the composition of crystalline magnesium sialon represented by the general formula $Mg_{x/2}Si_{6-y+x/2}Al_{y-x}O_yN_{8-y}$ ($0<x \leq y<8$) is equal to or greater than 0.9 but does not exceed 1, is based on that when x/y is less than 0.9, the stability of magnesium sialon crystals and forsterite crystals is not satisfied and these crystals are readily glassified at high temperatures.

The relative density of the sintered bodies of higher than 95% and the four point flexural strength at 1,400° C. in air being higher than 30 kg/mm² are defined in order to satisfy the properties having substantially no open pores and a practically useful strength at high temperatures which are necessary for materials used as mechanical parts at high temperatures.

Figure 2:
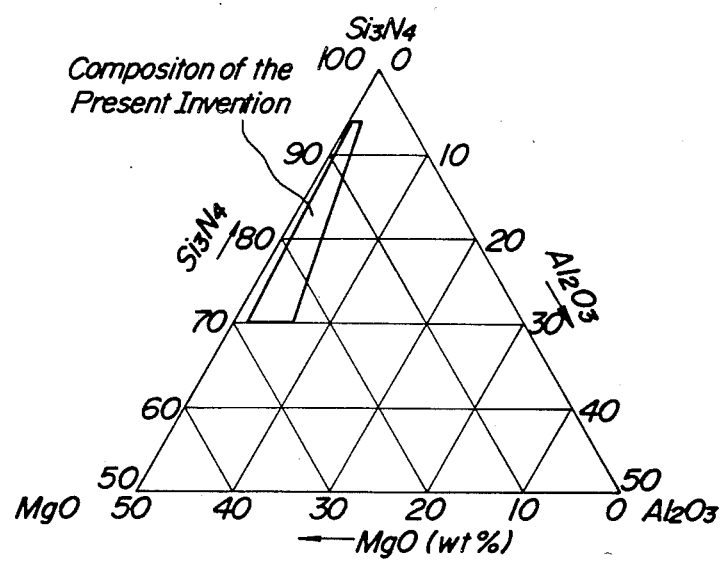
FIG. 2 is a ternary diagram showing the composition limit range of the present invention.

FIG. 2 shows the ternary diagram limiting the composition of the present invention.

Figure 3:
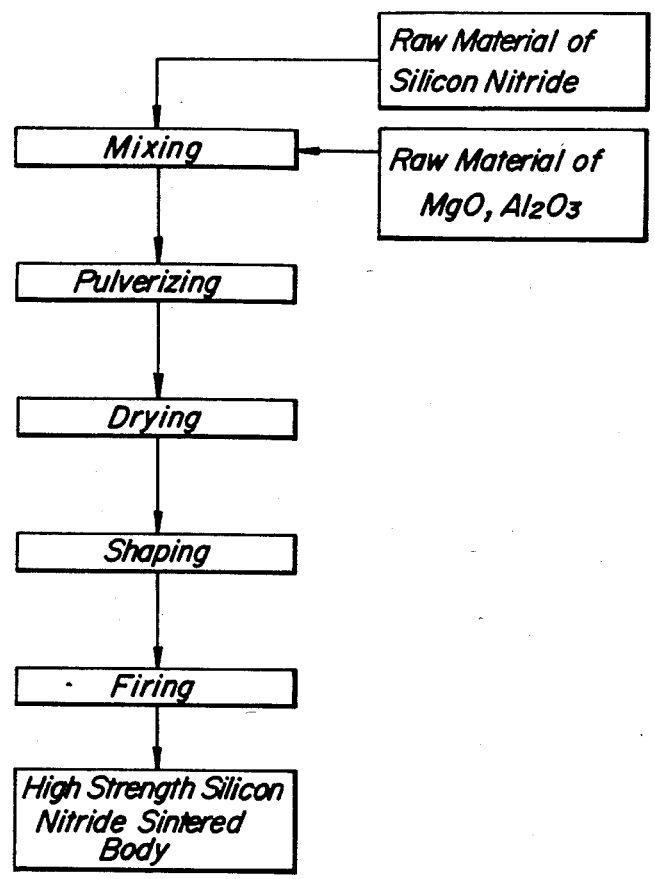
FIG. 3 is a block diagram of the method for producing silicon nitride sintered bodies according to the present invention.

The method for producing silicon nitride sintered bodies of the present invention is explained hereinafter in detail with reference to the block diagram shown in FIG. 3. To a raw material powder of silicon nitride having high purity, which contains less than 2% by weight, preferably 1.5% by weight of oxygen are added MgO and $Al_2O_3$ powders having high purity so that the total amount of MgO and $Al_2O_3$ is from 6% by weight to 30% by weight and the weight ratio of $MgO/Al_2O_3$ is 4–19. The resulting mixture is pulverized by a rotary mill, a vibratory mill, attrition mill and the like. The pulverizing step may be carried out by any of wet process and dry process but in order to prevent the oxidation of $Si_3N_4$ as far as possible, the pulverizing medium may be benzene, xylene, ether and the like and it is further preferable that the vessel is filled with nitrogen gas.

The mixture is pulverized until it is thoroughly finely divided and then taken out from the vessel and dried and then the pulverized particles are granulated to obtain powder for shaping. In this case, if necessary, a shaping aid, such as polyvinyl alcohol and the like, which is a temporary thickener, may be added. This shaping powder is formed into desired shapes through hydrostatic press molding, extruding, injection molding and the like and then fired in nitrogen or an inert gas under ambient pressure. The firing temperature is 1,650°–1,850° C., preferably 1,700°–1,750° C. for 0.2–2 hours.

The raw material powder of silicon nitride used in the present invention is preferred to be ones in which the total amount of metal impurities is less than 1% by weight, the content of $\alpha$-$Si_3N_4$ is more than 80% by weight, preferably more than 90% by weight, a BET specific surface area is 5–50 m²/g, preferably 7–20 m²/g and the average grain size is less than 5 μm, preferably less than 2 μm. MgO and $Al_2O_3$ are particularly preferable to have the purity of more than 99% by weight, the average grain size of less than 5 μm and a BET specific surface area of 5–50 m²/g. However, any material which can form MgO and $Al_2O_3$ through firing may be used, and for example, a hydrolyzate of alkoxide or a hydrate of alloy which has been adjusted in the given $MgO/Al_2O_3$ ratio may be used.

In the method for producing the sintered bodies of the present invention, it is most important that the oxygen content of the raw material powder of silicon nitride is not greater than 2% by weight and when said content exceeds 2% by weight, a substance consisting of $MgO$-$Al_2O_3$-$SiO_2$ ternary systems and having a low melting point is formed. This prevents the formation of crystalline magnesium sialon crystalline and forsterite and the strength at high temperatures is deteriorated. The definition of the firing temperature of 1,650°–1,850° C. is based on the following reason. When the temperature is lower than 1,650° C., the sintering does not proceed satisfactorily and the density of the sintered bodies is low, while when the temperature exceeds 1,850° C., $Si_3N_4$ is decomposed and evaporates.

The total amount of metal impurities in the raw material powder of silicon nitride is preferred to be less than 1% by weight, because when the total amount of Fe, Ti, Ca, Na, K and the like, which are metal impurities, exceeds 1% by weight, these impurities react with $Si_3N_4$, MgO, $Al_2O_3$ and an amount of glass having a low melting point increases, resulting in a reduction of the high temperature strength of the sintered bodies.

The definition of the content of $\alpha$-$Si_3N_4$ crystal in the raw material powder of silicon nitride being not less than 80% by weight is based on the following reason. When the content of $\alpha$-$Si_3N_4$ crystal in the raw material is less than 80% by weight, the strength of the sintered bodies does not reach a practically useful level. The BET specific surface area of the raw material powder of silicon nitride is preferred to be 2–50 m²/g, because when said specific surface area is less than 2 m²/g, the sinterability is poor and satisfactory densification cannot be obtained. While when said area is greater than 50 m²/g, the cohesive force of the powder becomes strong and the uniform mixing with MgO and $Al_2O_3$ powders becomes difficult.

The average grain size is defined to be no greater than 5 μm, because when the average grain size exceeds 5 μm, the sinterability is poor and the satisfactory densification cannot be obtained.

Si$_3$N$_4$ crystals and forsterite crystals in silicon nitride sintered bodies of the present invention are identified by X-ray diffractometry of the powdery materials. Crystalline magnesium sialon is identified by the fact that the crystal shows the lattice image inherent to magnesium sialon and contains Mg, Al and Si by the observation through transmission electron microscope provided with X-ray analyzer.

The composition x/y of crystalline magnesium sialon is determined by the following formula $$x/y = 2R/(1+2R),$$

wherein R is a molar ratio of Mg/Al in the crystal and is measured by a thin film quantitative analyzing process using the Cliff-Lorimer model. The strength means the four point flexural strength following to JIS R-1601 "Testing Method for Flexural Strength (Modulus of Rupture) of High Performance Ceramics" and the creep resistance at high temperature means the creep rate at the 0.3% strain by applying a load of 20 kg/mm$^2$ at 1,200° C. in air under the same condition as in the method for measuring the four point flexural strength.

The following examples are given for the purpose of illustration of this invention and are not intended as limitations thereof.

EXAMPLE 1

To raw material powder of silicon nitride having oxygen content of 1.4% by weight, a total content of metal impurities of 0.9% by weight, a BET specific surface area of 5.3 m$^2$/g and an average grain size of 3.4 μm were added MgO and Al$_2$O$_3$ powders having purity of more than 98% by weight, a BET specific surface area of 12 m$^2$/g, an average grain size of 2 μm in the mixing ratios shown in the following Table 1; Further, 500 g of the resulting mixture, 1 kg of nylon coated grinding balls and 1,000 ml of benzene were charged into a plastic vessel having an inner capacity of 2 l and air in the vessel was purged with nitrogen gas and then pulverized by means of a rotary mill at 100 rotations per minute for 300 hours. After finishing the pulverizing, the slurry was dried in nitrogen gas at 90° C. and the dried powder was passed through a sieve having an opening of 300 μm to obtain shaping powder. This powder was pre-shaped under a pressure of 200 kg/cm$^2$ into 60×60×7 (mm) and the pre-shaped body was covered with a rubber bag and subjected to hydrostatic pressing under a pressure of 2.5 ton/cm$^2$. This shaped body was put in a crucible made of graphite having high purity and sintered under ambient pressure in nitrogen gas at the sintering temperatures listed in Table 1 for 30 minutes to obtain silicon nitride sintered bodies of the present invention of No. 1–No. 11.

Figure 4:
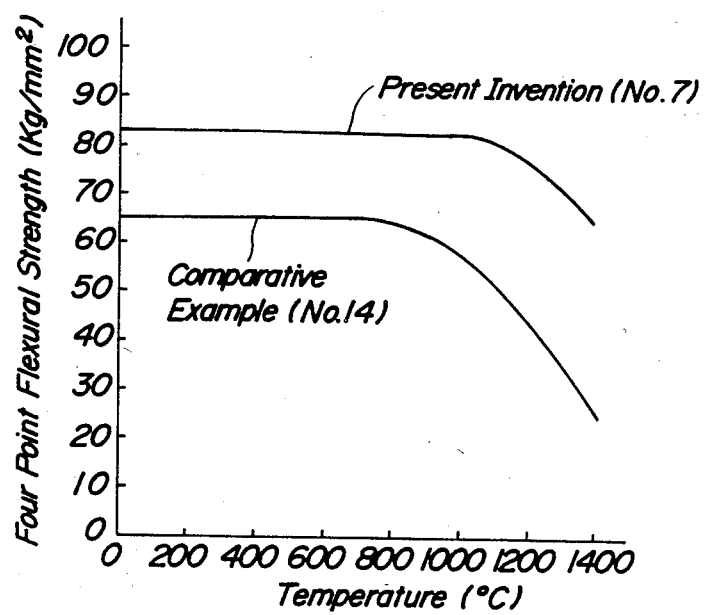
FIG. 4 shows the four point flexural strength from room temperature to 1,400° C. of a silicon nitride sintered body of the present invention and that of a comparative example.

Comparative sintered bodies (No. 12–No. 19) which were not within the limited composition area of the present invention, were prepared under the same conditions as described above. With respect to these sintered bodies, the relative density, the four point flexural strength, the creep rate in air at 1,200° C., the crystal phase and the like were measured for comparison. The obtained results are shown in Table 1. The temperature and the strength of an example of the present invention and a comparative example are shown in FIG. 4.

TABLE 1(a)

|  | Sample No. | Mixing ratio (wt %) | | | MgO + Al$_2$O$_3$ (wt %) | MgO/Al$_2$O$_3$ (weight ratio) | Firing temperature (°C.) | Relative density (%) |
| --- | --- | --- | --- | --- | --- | --- | --- | --- |
|  |  | Si$_3$N$_4$ | MgO | Al$_2$O$_3$ |  |  |  |  |
| Present invention | No. 1 | 93.9 | 5.79 | 0.31 | 6.1 | 18.7 | 1,800 | 97.1 |
|  | No. 2 | 80.0 | 19.0 | 1.0 | 20.0 | 19.0 | 1,750 | 97.2 |
|  | No. 3 | 70.0 | 28.5 | 1.5 | 30.0 | 19.0 | 1,750 | 97.8 |
|  | No. 4 | 93.9 | 5.5 | 0.6 | 6.1 | 9.2 | 1,800 | 96.9 |
|  | No. 5 | 92.0 | 7.0 | 1.0 | 8.0 | 7.0 | 1,750 | 97.0 |
|  | No. 6 | 84.5 | 14.0 | 1.5 | 15.5 | 9.3 | 1,750 | 98.6 |
|  | No. 7 | 80.0 | 18.0 | 2.0 | 20.0 | 9.0 | 1,750 | 98.5 |
|  | No. 8 | 70.0 | 27.0 | 3.0 | 30.0 | 9.0 | 1,750 | 98.0 |
|  | No. 9 | 93.9 | 4.9 | 1.2 | 6.1 | 4.1 | 1,850 | 97.5 |
|  | No. 10 | 80.0 | 16.0 | 4.0 | 20.0 | 4.0 | 1,750 | 97.7 |
|  | No. 11 | 70.0 | 24.0 | 6.0 | 30.0 | 4.0 | 1,650 | 97.8 |
| Comparative example | No. 12 | 94.0 | 5.8 | 0.2 | 6.0 | 29.0 | 1,750 | 94.0 |
|  | No. 13 | 80.0 | 19.1 | 0.9 | 20.0 | 21.2 | 1,750 | 93.2 |
|  | No. 14 | 68.0 | 30.5 | 1.5 | 32.0 | 20.3 | 1,750 | 94.1 |
|  | No. 15 | 68.0 | 29.0 | 3.0 | 32.0 | 9.7 | 1,650 | 94.3 |
|  | No. 16 | 68.0 | 24.0 | 8.0 | 32.0 | 3.0 | 1,700 | 93.4 |
|  | No. 17 | 80.0 | 15.0 | 5.0 | 20.0 | 3.0 | 1,750 | 94.2 |
|  | No. 18 | 94.0 | 4.5 | 1.5 | 6.0 | 3.0 | 1,800 | 91.9 |
|  | No. 19 | 94.0 | 5.5 | 0.5 | 6.0 | 11.0 | 1,850 | 89.0 |

TABLE 1(b)

|  | Sample No. | Composition of sintered body | | Four point flexural strength (kg/mm$^2$) | | | Creep rate (hr$^{-1}$) 1,200° C. | Crystals in sintered body* |
| --- | --- | --- | --- | --- | --- | --- | --- | --- |
|  |  | MgO + Al$_2$O$_3$ (wt %) | MgO/Al$_2$O$_3$ (weight ratio) | Room temperature | 1,200° C. | 1,400° C. |  |  |
| Present invention | No. 1 | 6.1 | 18.6 | 73 | 63 | 45 | 6.2 × 10$^{-5}$ | SN, F |
|  | No. 2 | 20.0 | 18.8 | 75 | 65 | 47 | 4.2 × 10$^{-5}$ | SN, F |
|  | No. 3 | 30.0 | 18.9 | 74 | 68 | 48 | 3.6 × 10$^{-5}$ | SN, F |
|  | No. 4 | 6.1 | 9.2 | 77 | 67 | 45 | 6.3 × 10$^{-5}$ | SN, MS, F |
|  | No. 5 | 7.9 | 7.0 | 81 | 69 | 55 | 1.1 × 10$^{-5}$ | SN, MS, F |
|  | No. 6 | 15.6 | 9.3 | 80 | 76 | 68 | 1.6 × 10$^{-5}$ | SN, MS, F |

TABLE 1(b)-continued

| | Sample No. | Composition of sintered body | | Four point flexural strength (kg/mm$^2$) | | | Creep rate (hr$^{-1}$) 1,200° C. | Crystals in sintered body* |
|---|---|---|---|---|---|---|---|---|
| | | MgO + Al$_2$O$_3$ (wt %) | MgO/Al$_2$O$_3$ (weight ratio) | Room temperature | 1,200° C. | 1,400° C. | | |
| | No. 7 | 20.0 | 8.9 | 83 | 78 | 65 | 1.5 × 10$^{-5}$ | SN, MS, F |
| | No. 8 | 30.0 | 8.9 | 76 | 71 | 66 | 1.7 × 10$^{-5}$ | SN, MS, F |
| | No. 9 | 6.1 | 4.1 | 74 | 64 | 51 | 2.9 × 10$^{-5}$ | SN, MS |
| | No. 10 | 20.0 | 4.0 | 72 | 66 | 47 | 3.0 × 10$^{-5}$ | SN, MS |
| | No. 11 | 30.0 | 4.0 | 71 | 64 | 48 | 3.4 × 10$^{-5}$ | SN, MS |
| Comparative example | No. 12 | 6.0 | 28.7 | 68 | 42 | 24 | 6.2 × 10$^{-3}$ | SN |
| | No. 13 | 20.1 | 21.0 | 70 | 46 | 29 | 1.2 × 10$^{-3}$ | SN |
| | No. 14 | 32.2 | 20.1 | 65 | 44 | 27 | 3.4 × 10$^{-3}$ | SN |
| | No. 15 | 32.1 | 9.7 | 64 | 46 | 21 | 8.9 × 10$^{-3}$ | SN |
| | No. 16 | 32.0 | 3.0 | 58 | 43 | 13 | 5.9 × 10$^{-2}$ | SN, MS |
| | No. 17 | 20.0 | 3.0 | 55 | 41 | 10 | 9.0 × 10$^{-2}$ | SN, MS |
| | No. 18 | 6.0 | 3.0 | 51 | 43 | 18 | 9.2 × 10$^{-3}$ | SN |
| | No. 19 | 6.0 | 11.0 | 48 | 37 | 18 | 8.9 × 10$^{-3}$ | SN |

*SN: Si$_3$N$_4$ crystal
F: forsterite crystal
MS: magnesium sialon crystal

As shown from the results in Table 1 and FIG. 4, in silicon nitride sintered bodies obtained in the production method of the present invention, at least one crystal of magnesium sialon crystal and forsterite crystal is always formed together with Si$_3$N$_4$ crystal, the four point flexural strength at 1,400° C. in air is greater than 40 kg/mm$^2$ and the creep rate at 1,200° C. is less than 7×10$^{-5}$ hr$^{-1}$. While in the comparative examples, the strength at 1,400° C. is less than 30 kg/mm$^2$ and the creep rate at 1,200° C. is greater than 1×10$^{-3}$ hr$^{-1}$ and therefore the degradation of the strength at high temperature in the present invention is low and excellent mechanical properties are obtained. Particularly, in No. 5, No. 6, No. 7 and No. 8 in the present invention, the strength at 1,400° C. is excellent, greater than 50 kg/mm$^2$.

It is apparent that even when each of crystalline magnesium sialon and crystalline forsterite is contained alone, satisfactory properties are developed, but when both the crystals are contained, superior strength and creep resistance at high temperatures can be obtained.

EXAMPLE 2

A ratio of x to y (x/y) of magnesium sialon crystal shown by the general formula Mg$_{x/2}$Si$_{6-y+x/2}$Al$_{y-x}$O$_y$N$_{8-y}$ contained in the sample Nos. 4, 5, 6, 7 and 8 of the present invention in Example 1 was measured and the obtained results are shown in Table 2. The values of Comparative example Nos. 16 and 17 are also shown in Table 2.

TABLE 2

| | Sample No. | x/y | Strength at 1,400° C. (kg/mm$^2$) |
|---|---|---|---|
| Present invention | No. 4 | 0.95 | 45 |
| | No. 5 | 0.96 | 55 |
| | No. 6 | 0.98 | 68 |
| | No. 7 | 0.91 | 65 |
| | No. 8 | 0.91 | 66 |
| Comparative example | No. 16 | 0.82 | 13 |
| | No. 17 | 0.76 | 10 |

As shown in Table 2, when crystalline magnesium sialon having x/y of not less than 0.9 is contained, the four point flexural strength at 1,400° C. is higher than 40 kg/mm$^2$ while when x/y is less than 0.9, said strength is less than 20 kg/mm$^2$. Thus, it can be confirmed that the sintered bodies wherein x/y of crystalline magnesium sialon is within the limited scope of the present invention of not less than 0.9, have a particularly high strength at high temperatures.

As mentioned above, silicon nitride sintered bodies of the present invention contain the given amount and the given ratio of MgO and Al$_2$O$_3$ and at least one of crystalline magnesium sialon and crystalline forsterite as the second phase, and the amount of glass which is readily formed in the grain boundary of Si$_3$N$_4$ crystal is very small. Therefore, the sintered bodies having particularly excellent strength and creep resistance at high temperatures can be easily and inexpensively produced and these sintered bodies can be utilized for structural materials which are subjected to high temperatures, particularly high temperature turbine engine parts, high temperature ball bearings, various high temperature parts and the like, and the industrially commercial value is very high.

What is claimed is:

1. Pressureless sintered silicon nitride bodies consisting of silicon nitride combined with MgO and Al$_2$O$_3$, in a total amount of at least 7.9% by weight of MgO and Al$_2$O$_3$ in the pressureless sintered bodies and not greater than 30% by weight of MgO and Al$_2$O$_3$ in the pressureless sintered bodies, wherein a weight ratio of MgO/Al$_2$O$_3$ is within a range of 7-9.3 and crystalline phases contained in the pressureless sintered bodies consist essentially of crystalline Si$_3$N$_4$, magnesium sialon and forsterite, said magnesium sialon being represented by the general formula

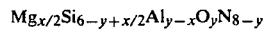

$$Mg_{x/2}Si_{6-y+x/2}Al_{y-x}O_yN_{8-y}$$

wherein $0 < x \leq y < 8$, $x/y = 2R/(1+2R)$, wherein R is a molar ratio of Mg/Al, and $0.9 \leq x/y < 1$, and said forsterite being represented by the formula Mg$_2$SiO$_4$, said sintered bodies having a relative density of greater than 95% and a four point flexural strength of greater than 55 Kg/mm$^2$ at 1,400° C. in air and a four point flexural strength of at least 76 Kg/mm$^2$ at room temperature.

2. Pressureless sintered silicon nitride bodies consisting of silicon nitride combined with MgO and Al$_2$O$_3$, in a total amount of at least 7.9% by weight of MgO and Al$_2$O$_3$ in the sintered bodies and not greater than 30% by weight of MgO and Al$_2$O$_3$ in the pressureless sintered bodies, wherein a resultant weight ratio of MgO/Al$_2$O$_3$ is within a range of 7-9.3 in the pressureless sintered bodies and crystalline phases contained in the pressureless sintered bodies consist essentially of crystalline $Si_3N_4$ magnesium sialon and forsterite, said magnesium sialon being represented by the general formula $$Mg_{x/2}Si_{6-y+x/2}Al_{y-x}O_yN_{8-y}$$

wherein $0 < x \leq y < 8$, $x/y = 2R/(1+2R)$, wherein R is a molar ratio of Mg/Al, and $0.9 \leq x/y < 1$, and said forsterite being represented by the formula $Mg_2SiO_4$, said pressureless sintered bodies having a relative density of greater than 95% and a four point flexural strength of greater than 30 $Kg/mm^2$ at 1,400° C. in air and a four point flexural strength of at least 71 $Kg/mm^2$ at room temperature, made by a method consisting essentially of mixing a raw material powder of silicon nitride with MgO and $Al_2O_3$, said silicon nitride containing about 1.5% or less by weight of oxygen and less than 1% by weight of metal impurities, a content of crystalline $\alpha$-$Si_3N_4$ being not less than 80% by weight, having a BET specific surface area of 2-50 $m^2/g$ and an average grain size of not greater than 5 μm, pulverizing said mixture with a pulverizing means selected from the group consisting of a rotary mill, a vibratory mill and an attrition mill, whereby oxidation of the silicon nitride in the resulting mixture is substantially prevented by using a pulverizing medium selected from the group consisting of benzene, xylene and ether, said pulverizing occurring in the presence of a nitrogen atmosphere, shaping and firing the resulting mixture at a temperature of 1,650°-1,850° C. in an atmosphere selected from the group consisting of nitrogen and an inert gas under substantially atmospheric pressure.

* * * * *